Figures 1, 2:
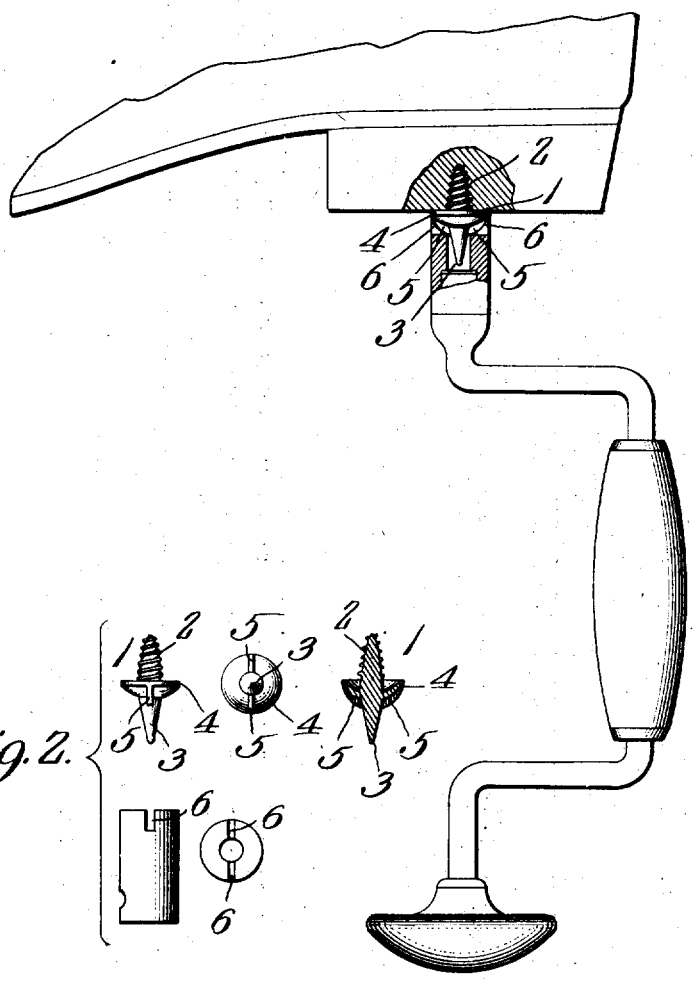

No. 12,644. REISSUED APR. 30, 1907.

C. PFEIFFER.

BOOT CALK.

APPLICATION FILED AUG. 18, 1906.

Witnesses

Jos. H. Collins.

Chas. P. Egerton.

Inventor

Christian Pfeiffer

By C. D. Shurtleff

Attorney

UNITED STATES PATENT OFFICE.

CHRISTIAN PFEIFFER, OF NEW BRITAIN, CONNECTICUT, ASSIGNOR TO THE NORTH & PFEIFFER MANUFACTURING COMPANY, A CORPORATION OF CONNECTICUT, AND LEVI H. MAXWELL, BOTH OF NEW BRITAIN, CONNECTICUT.

BOOT-CALK.

No. 12,644. Specification of Reissued Letters Patent. Reissued April 30, 1907.

Original No. 817,090, dated April 3, 1906. Application for reissue filed August 18, 1906. Serial No. 331,207.

*To all whom it may concern:*

Be it known that I, CHRISTIAN PFEIFFER, a citizen of the United States, residing at New Britain, in the county of Hartford, State of Connecticut, have invented certain new and useful Improvements in Boot-Calks, of which the following is a description, reference being had to the accompanying drawings, and to the figures of reference marked thereon.

My invention relates to an improvement in boot-calks of the kind used by lumbermen and loggers, and is an improvement upon the device illustrated in the patent granted A. B. Lipscomb, August 11, 1903, No. 736,121.

As shown in said patent, a dished stop is employed having the threaded shank and spike, the spike for a portion of its length adjacent the stop-disk being square in cross-section, the remaining portion of its length being circular or approximately circular in cross-section and tapered to a sharp point.

In practice it has been found very difficult to get the square on the calk sufficiently large to afford a good bearing-surface, and it is difficult in squaring the hole in the chucks to keep them uniform. Thus the chucks do not fit closely on the squared portion and there is a tendency to slip. As soon as the chucks have slipped once or twice the corners begin to wear round and are soon useless.

It is the object of the present invention to overcome these defects and at the same time increase the strength of the dished stop.

The invention therefore consists in the matters hereinafter described and referred to in the appended claims.

The invention is illustrated in the accompanying drawings, in which—

Figure 1 is a view in sectional elevation showing the manner in which the calk is applied to the boot-heel. Fig. 2 is a view in elevation of the calk and chuck.

In the drawings, 1 represents the calk, comprising the threaded shank 2, the spike 3, and the plate or disk 4 herein shown as dished, as in the patent referred to. The latter has the integral ribs 5, extending from the shank portion of the spike 3 to the periphery of the dished stop, these ribs being adapted to fit recesses 6 in the chuck-bit brace, whereby a positive holding of the chuck to the calk is provided without any danger of slipping or wearing away of the shank and serving to strengthen the disk.

By the use of the ribs a strong and positive hold of the chuck on the body of the calk itself is possible, the spike portion thereof not being engaged at all, and by this construction the spike may be made round instead of squared and thinner in cross-section than heretofore and even when worn away materially will still be sharp enough to perform its function, whereas in the former construction as soon as the spike portion had worn down to the squared portion the spike became too blunt for use. Furthermore, by this construction only a round hole has to be made in the center of the chuck, thus cheapening the cost thereof. While the ribs are herein shown as applied to a dished stop disk of the style shown in the above patent, it will be understood that so far as their construction and arrangement are concerned, they are applicable to stop plates or disks of other forms.

Having thus described my said invention, what I claim, and desire to secure by Letters Patent, is—

1. As a new article of manufacture, a boot-calk having a dished stop-disk, a screw-threaded shank extending from the concave side thereof, and a spike extending from the convex side of the disk, said spike tapering toward its lower end, the surface of the disk from which the spike extends having strengthening-ribs extending from the spike toward the periphery of the disk, and adapted also to be engaged by the chuck of an inserting-tool, the ribs terminating short of the point of the spike, substantially as described.

2. A boot-calk comprising a dished disk having radiating ribs on its convex side, a spike projecting beyond the ribs, and a threaded shank extending from the concave side of the disk.

3. A boot-calk comprising a dished disk having radiating ribs on its convex side, a cone-shaped spike projecting beyond the ribs, and a threaded shank extending from the concave side of the disk.

4. As a new article of manufacture, a boot calk, having a stop plate or disk, a screw-threaded shank extending from one side thereof and a spike extending from the opposite side thereof, said spike tapering toward its lower end, the surface of the disk or plate from which the spike extends having strengthening ribs extending from the spike toward the periphery of the disk, and adapted also to be engaged by the chuck of an inserting tool, the ribs terminating short of the point of the spike.

CHRISTIAN PFEIFFER.

In presence of—
JOHN H. KIRKHAM,
ANNA C. MALMFELDT.